(No Model.)
D. M. WESTON.
Milk Creaming Apparatus.
No. 239,900. Patented April 5, 1881.
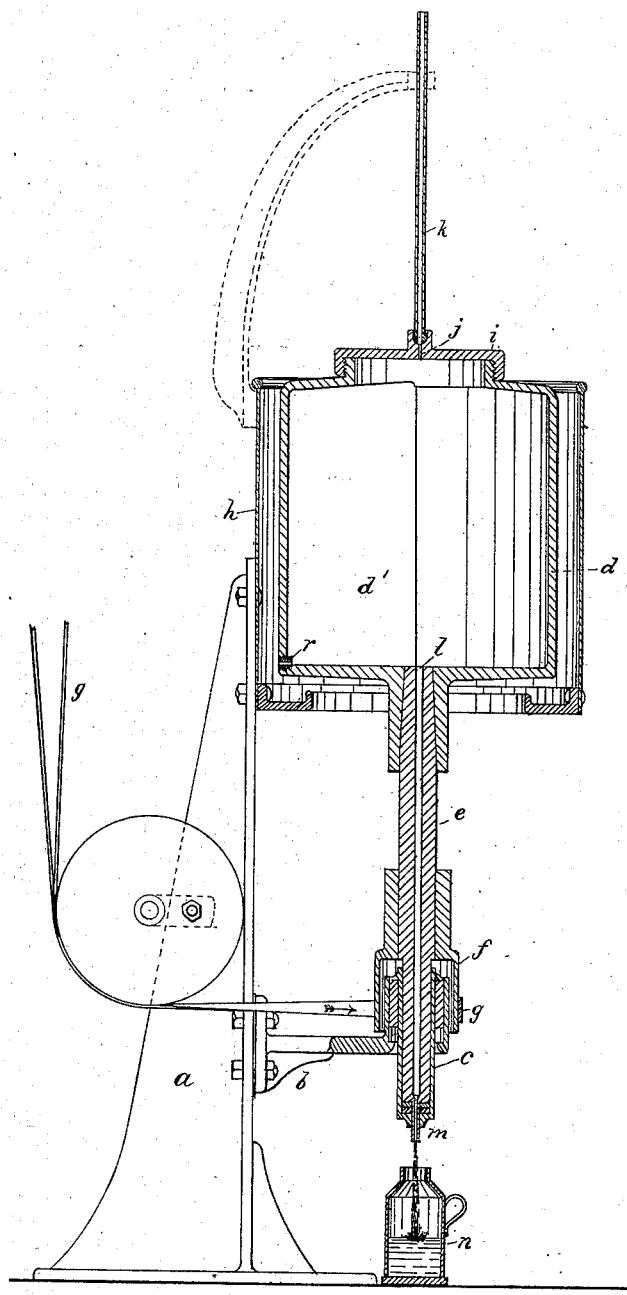
Witnesses
L. F. Connor.
Arthur Reynolds.
Inventor.
David M. Weston.
by Crosby Gregory, Attys

UNITED STATES PATENT OFFICE.

DAVID M. WESTON, OF BOSTON, MASSACHUSETTS.

MILK-CREAMING APPARATUS.

SPECIFICATION forming part of Letters Patent No. 239,900, dated April 5, 1881.

Application filed July 26, 1880. (No model.)

*To all whom it may concern:*

Be it known that I, DAVID M. WESTON, of Boston, county of Suffolk, State of Massachusetts, have invented an Improvement in Apparatus for Creaming Milk, of which the following description, in connection with the accompanying drawing, is a specification.

This invention relates to apparatus for creaming milk, and the invention has for its object the production of a simple, cheap, and effective apparatus for this purpose.

In this my present invention the milk, under hydrostatic pressure, is introduced within the top of the rotating drum, preferably in line with its center of rotation. The cream is discharged from the drum through an outlet located substantially at the exact center of rotation of the drum, a very small orifice being there made for such purpose.

As herein shown, the cream-delivery orifice is made through the center of the drum shaft or spindle $e$, being prolonged below its lower bearing, and the skim-milk is discharged from the drum through a suitable skim-milk orifice of proper size to take away the skim-milk as fast as it is separated.

I have found during my various experiments in creaming milk by centrifugal force that the globules of the cream are broken during the lateral discharge of the cream into the usual annular case or spout, such concussion and breakage of the globules partially churning the cream while sweet, causing the cream to sour rapidly; but in this my present machine, and in accordance with my process, the cream is made to flow off or away from the machine gently by a force dependent upon the degree of hydrostatic pressure, which may be more or less, and produced in any usual way, in the inlet-pipe above the drum, the gravity of the cream also preferably being made effective in its steady delivery. The globules in the cream so discharged or pressed from the drum remain unbroken, enabling the cream to be kept sweet for a longer time than when broken. Taking the cream directly from substantially the exact center of the machine, or its axis of rotation, obviates violent concussion of the cream-globules, as is the case in all that class of creaming-machines wherein cream is sent off from the drum by centrifugal force, the said cream striking and being caught by the walls of a circular gutter or trough.

The drawing represents in vertical section a creaming-machine embodying my present invention, and by which my present method of separating the cream from the milk may be practiced.

The frame $a$, of proper size and strength, has a bracket, $b$, to support the usual flexibly-held step common to centrifugal machines made by me.

The drum $d$, with the usual fixed wing or driver, $d'$, is herein shown as attached to the upper end of the spindle $e$, provided with the band-pulley $f$, about which is extended the band $g$, driven in any usual way. The drum is contained within the stationary inclosing-case $h$, attached to the frame $a$. The top end of the drum has a cover, $i$, suitably secured thereto, and provided with an opening, $j$, preferably in line with the center of rotation of the said drum.

The milk to be separated or creamed is introduced into the drum through the inlet or supply pipe $k$, extended above it, as shown in the drawing, and in communication with a reservoir or any suitable supply for the milk, the milk delivered into the drum being delivered therein under hydrostatic pressure to a greater or less degree.

At the exact center of the bottom of the drum I have made a cream discharge or outlet, $l$, so that the cream at the center of the drum, aided by hydrostatic pressure and gravity, is free to escape from the drum in the line of its axis of rotation and falls into a suitable pan or vessel, thus avoiding such lateral discharge of the cream as causes it to be thrown radially against the walls of a circular vessel or drum, as heretofore commonly practiced.

The spindle $e$ is bored centrally to form a passage continuous with the cream-discharge $l$, the cream being finally discharged or delivered from the tube $m$ into a suitable vessel or can, $n$.

My apparatus herein described may be employed for other uses than separating cream from milk.

The skim-milk is discharged at the bottom of the drum through an outlet, $r$, into the usual surrounding casing, $h$.

In operation the drum will be kept full of milk, thus preventing swashing and churning.

I do not claim a creaming-machine in which the skim-milk is forced off or out through an axial passage by pressure of increasing milk, the said machine discharging the cream laterally into a receiver; and I am also aware of the apparatus described in the English Patent to De Laval, No. 4,459, November 4, 1878, and herein make no claim to anything therein shown.

Having withdrawn from this application, to form a new application, the following matter, I do not herein claim said matter, viz: first, the covered rotating drum provided with the axial outlet $l$ for the material of least specific gravity, and with an outlet at its outer side for the material of greatest specific gravity, combined with the inlet-pipe, to permit the milk or other material to be introduced into the drum, and with the surrounding casing, substantially as described; second, that improvement in the art or method of creaming milk which consists in separating the milk and cream by centrifugal action and discharging the cream directly from the center of the drum through an axial outlet leading from the center of the drum outward in the direction of the axis of the drum, to thus prevent breaking the cream-globules, as and for the purpose set forth; third, that improvement in the art of creaming milk which consists in feeding the drum with milk under hydrostatic pressure, separating the cream from the milk by centrifugal action while the milk is under hydrostatic pressure, and discharging the cream directly from the center of the drum in the line of its axis of rotation by hydrostatic pressure, substantially as described.

I claim—

The combination, in an apparatus for the centrifugal separation of materials of different densities, of a rotating separating-vessel having a single supply and two separate discharge-openings, an inclosing-case communicating with the skim-milk-discharge opening of said vessel, and a tubular shaft upon which the separating-vessel is mounted, and which communicates with the cream-discharge opening thereof, substantially as set forth.

In testimony whereof I have signed my name to this specification in the presence of two subscribing witnesses.

DAVID M. WESTON.

Witnesses:
G. W. GREGORY,
N. E. C. WHITNEY.